United States Patent [19]

Petri et al.

[11] Patent Number: 4,991,167

[45] Date of Patent: Feb. 5, 1991

[54] VOICE CONTROLLED ATTENUATION ADJUSTMENT IN TELEPHONE TRANSMISSION CIRCUITS

[75] Inventors: Udo Petri, Taunussein; Eberhard Hänsler; Birger Hätty, both of Darmstadt, all of Fed. Rep. of Germany

[73] Assignee: Telenorma Telefonbau und Normalzeit GmbH, Franfurt am Main, Fed. Rep. of Germany

[21] Appl. No.: 307,324

[22] Filed: Feb. 6, 1989

[30] Foreign Application Priority Data

Aug. 22, 1987 [GB] United Kingdom ............... 3728109

[51] Int. Cl.$^5$ ............................................. H04J 1/00
[52] U.S. Cl. .................................. 370/32.1; 379/406; 379/410
[58] Field of Search ............... 379/390, 389, 388, 406, 379/407, 408, 409, 410; 370/32, 32.1

[56] References Cited

U.S. PATENT DOCUMENTS

| 3,699,271 | 10/1972 | Berkley et al. ........................ 379/408 |
| 3,900,708 | 8/1975 | Bendel ................................... 379/409 |
| 3,946,170 | 3/1976 | Brooks . | |
| 4,513,177 | 4/1985 | Nishino et al. . | |
| 4,571,461 | 2/1986 | Uno et al. . | |
| 4,600,815 | 7/1986 | Horna . | |
| 4,715,063 | 12/1987 | Haddad et al. ........................ 379/390 |

FOREIGN PATENT DOCUMENTS

| 2714132 | 6/1979 | Fed. Rep. of Germany . |
| 2852864 | 6/1979 | Fed. Rep. of Germany . |
| 3407203 | 8/1985 | Fed. Rep. of Germany . |
| 3431141 | 3/1986 | Fed. Rep. of Germany . |
| 3606973 | 10/1986 | Fed. Rep. of Germany . |
| 3613972 | 11/1986 | Fed. Rep. of Germany . |
| 3706540 | 9/1987 | Fed. Rep. of Germany . |
| 62-18836 | 1/1987 | Japan . |
| 0043451 | 2/1988 | Japan ..................................... 379/406 |
| 2174578 | 11/1986 | United Kingdom . |

OTHER PUBLICATIONS

P. Vary and G. Wackersreuther, "A Unified Approach to Digital Polyphase Filter Banks", AEÜ, Band 37 [1983] Heft ½, pp. 29-34.

G. Wackersreuther, "On the Design of Filters for Ideal QMF and Polyphase Filter Banks", AEÜ Band 34 [1985] Heft 2, pp. 123-130.

"Improvement of Acoustic Feedback Stability by Frequency Shifting", M. R. Schroeder, The Journal of Acoustical Society of America, vol. 36, No. 7, Sep. 1964, pp. 1718-1724.

Primary Examiner—Jin F. Ng
Assistant Examiner—Jhancy Augustus
Attorney, Agent, or Firm—Marmorek, Guttman & Rubenstein

[57] ABSTRACT

A process and apparatus for a voice controlled attenuation adjustment in telephone transmission circuits is disclosed. Signals in the sending and receiving directions are decomposed into sub-band signals in a set of frequency sub-bands. Each frequency sub-band is associated with an attenuation device for each direction of transmission. Depending on the level of activity in each direction in a particular sub-band, the attenuation values of the attenuation devices of that particular sub-band are adjusted. The sub-band signals are then recombined.

2 Claims, 3 Drawing Sheets

VOICE CONTROLLED ATTENUATION ADJUSTMENT IN TELEPHONE TRANSMISSION CIRCUITS

FIELD OF THE INVENTION

The instant invention relates to a process and apparatus for voice-controlled attenuation adjustments in telephone transmission circuits, in particular for free voice devices, whereby the signal in one direction of transmission is controlled as a function of the signal in the other direction of transmission and whereby adjustable attenuation devices incorporated into the signal paths are prompted by control signals to alter their attenuation values.

BACKGROUND OF THE INVENTION

A circuit arrangement for a free voice telephone by means of which uncoupling between the two transmission paths is achieved is known from DE-OS No. 36 06 973. By means of a voice control circuit, which favors transmission in one transmission path and hinders it in the other transmission path as a function of the voice level in both transmission paths, the possibility is provided for controlling the band width of the two transmission paths by means of controllable filters. In this manner a greater portion of the frequency band is put at the disposal of the transmission path with the higher voice level than to the transmission path with the lower voice level. This is done by changing the impulse frequency of a voltage-controlled oscillator as a function of the voice level values. Limit frequencies occurring during silence intervals are shifted when the signal level rises in such a manner that the receiving (i.e., incoming) direction can transmit only at the lowest frequencies when the signal level in the sending (i.e. outgoing) direction is higher, and the sending direction can only transmit at the highest frequencies when the signal level in the receiving direction is higher. It is not entirely impossible in this process that the frequency shifts impair voice quality, at least in the transition phases.

DE-OS No. 35 28 973 discloses a circuit arrangement for voice controlled attenuation of two signal paths with opposing directions of transmission with incorporated attenuation devices. The signal of one signal path is in each case taken off a controllable amplifier and is used to control the attenuation in the other signal path. This makes it possible to further attenuate the transmission path with the weaker signal and to attenuate the signal path with the stronger signal to a lesser degree. Since such regulating processes must constantly change and readjust in the course of a connection in two directions, especially in telephone connections, it may occur with such reversing events that a portion of the voice signal is lost. To avoid this, additional delay circuits are incorporated with the circuit arrangement described in DE-OS No. 35 28 973. Such delay circuits have, however, a non-negligible effect upon the overall propagation time, so that difficulties may occur in overseas connections for instance, when the type of connection alone already produces considerable signal propagation times.

The German periodical "Aarchiv für Elektronik und Uebertragungstechnik" volume 39, (1985) No. 2 contains an article starting on page 123 with the title: "Concerning the Development of Filters for ideal QMF and Polyphase Filter Banks". This is a process by means of which an audio frequency band can be divided into individual frequency sub-bands by means of an analysis filter bank. It is also possible to reconstruct the original signal from the individual frequency sub-bands by means of a synthesis filter bank working on similar principles. Analysis polyphase filter banks can also be used as demultiplexers for signal channels contained in a frequency multiplexed signal in order to select the individual connections offered in different frequency sub-bands. Furthermore it is possible to use polyphase filter banks when the problem comprises using trans-multiplexers in order to convert frequency multiplexed signals into time multiplexed signals or to convert time multiplexed signals into frequency multiplexed signals.

SUMMARY OF THE INVENTION

It is the object of the instant invention to propose a process by means of which voice controlled attenuation adjustments in telephone transmission circuits are achieved without the impairment of voice transmissions. The cutting-off of voice portions which occurs with known processes due to delays or long reponses times it to be avoided. Delayed responses which were necessary in the past in order to avoid overly frequent reversal of the attenuation in the directions of conversation are not to be used. The process is to be designed so that known measures for the suppression of acoustic echoes can be used in addition when this is required in individual cases.

This object is attained through the invention in that a control device is provided which decomposes the voice frequency band arriving at each input of the control device into several frequency sub-bands by means of analysis filter banks, in that each frequency sub-band is provided with its own adjustable attenuation device for each direction of transmission, which attenuation devices receive their adjustment commands from a level balance circuit that is triggered by an associated voice evaluation circuit and in that the individual frequency sub-bands are joined together by synthesis filter banks into a global voice frequency band appearing at each of the outputs of the control device.

The selective regulation of the individual frequency sub-bands yields a high degree of stability and voice intelligibility. Furthermore the possibility is provided for an almost full duplex connection to be produced because the sending direction can be more active in some frequency sub-bands while at the same time transmission in the receiving direction is possible with other frequency sub-bands. The division into frequency sub-bands furthermore makes it possible to have a smaller regulating range of the attenuating devices separately available for each frequency sub-band than with other known processes with only one attenuating device for the entire frequency band.

DETAILED DESCRIPTION OF THE INVENTION

Figure 1:
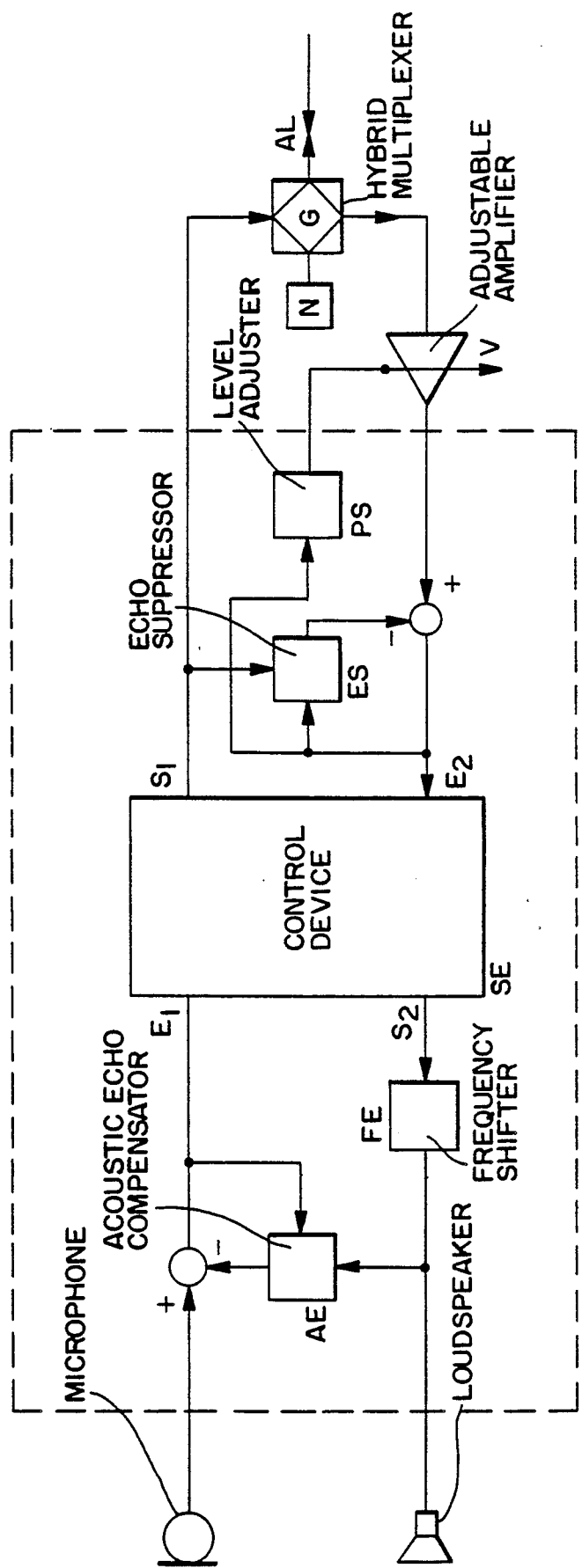
FIG. 1 shows a block diagram of a telephone transmission circuit, e.g. for a free voice installation.

FIG. 1 shows a block diagram of a free voice installation. Digital processing of the signals is carried out in the portion framed by a broken line. The required analog/digital (AD) and digital/analog (DA) converters, including the antialiaising filters are not shown for the sake of clarity. Digital processing can be carried out either in a specialized processor or in an universal digital signal processor, whereby software constitutes the function blocks. Mixed forms are also possible.

The microphone M is connected via the device described below to the sending input of a hybrid G. This hybrid circuit combines the incoming and outgoing signals onto the line AL in a known manner. The signals arriving from the line AL are transmitted via the hybrid to an adjustable amplifier V. The latter is adjusted by a level adjuster PS in such manner that the downstream AD converter (not shown) receives optimal level control. In this manner a compensation of weak reception levels is obtained.

In order to compensate for an erroneous adjustment of the hybrid circuit, an echo suppression circuit AE is connected between the two directions of transmission. In this way the signal portions which were transmitted from the sending path via the erroneously adjusted hybrid to the receiving path are removed. The acoustic echo compensator AE plays in principle a similar role. Here the signal portions coming from the loudspeaker L and reaching the microphone through space are removed, at least partially. It is in particular possible to suppress short acoustic echoes (direct sound) in this manner. Complete compensation of the acoustic coupling is only possible at comparatively great expense. Both compensators work according to the same principle. They are so-called adaptive filters which work for example according to the sufficiently well-known LMS algorithm.

Lit.: Sondhi, M.M.; Berley, D.A., Silencing Echoes on the Telephone Network, Proceedings of the IEEE, Vol. 68, No. 8, Aug. 1980.

Instead of the AE echo compensation, it is also selectively possible for the signal to the loudspeaker L to be shifted by means of a frequency shifting devive FE by approximately 5 Hz within the frequency range. Increased security with respect to acoustic feedback is thus obtained. Further background material can be found in the literature:

Lit.: Schröder, M.R., Improvement of Acoustic-Feedback Stability by Frequency Shifting, Acoustic Society of America 36 (1964) P. 1717-1724.

Figure 2:
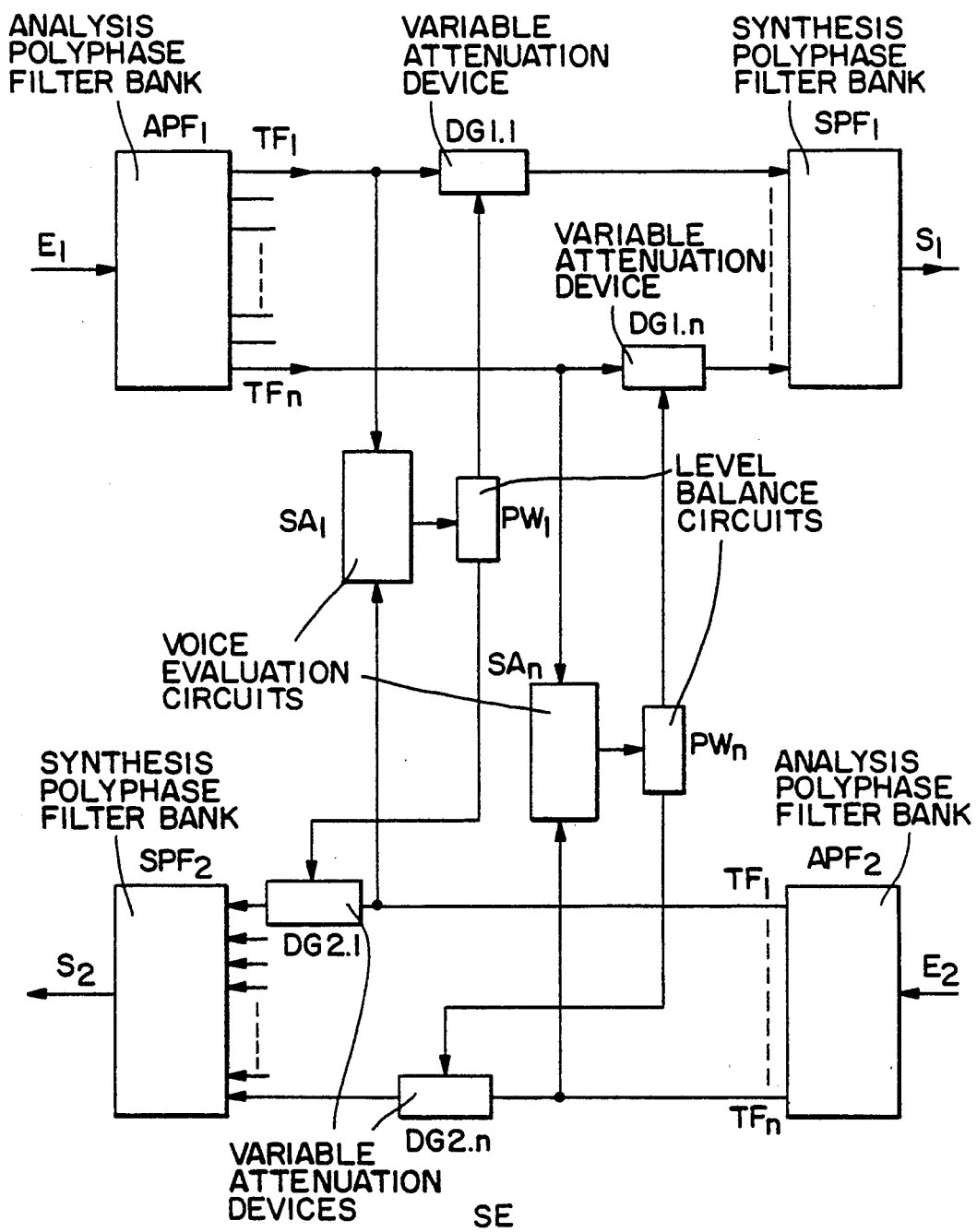
FIG. 2 shows a block diagram of a control device for carrying out a voice-controlled attenuation adjustment in accordance with the present invention.

FIG. 2 shows a control device SE in which a direction control is carried out in frequency sub-bands. The division into sub-bands and the reuniting following signal processing in the sub-bands is carried out here by means of so-called analysis polyphase filter banks (APF1, APF2) or of the synthesis polyphase filter banks (SPF1, SPF2). These are a special realization of digital filter bank structures which can be implemented at minimal cost with respect to the required calculation listing and storage space while observing certain marginal conditions. More detailed information can be found in:

Lit.: Vary, P; Wacherstreuter, G., A unified Approach to Digital Polyphase Filter Banks, AEÜ Vol. 37 (1983) Vol. ½.

The audio frequency signal coming from the microphone M (i.e., sending or outgoing direction) is connected at the input E1 to an analysis polyphase filter bank APF1. There it is broken down into individual sub-band signals in the frequency sub-bands TF1 to TFn. For each individual frequency sub-band TF its own path to a synthesis polyphase filter bank SPF1 working on the same principle is provided. A controllable attenuation device DG1.1 to DG1.n is incorporated into each one of these paths.

The same arrangement of analysis polyphase filter bank APF2 and synthesis polyphase filter bank SPF2 is provided for the receiving (i.e., incoming) direction, whereby the signal received at the input E2 is treated exactly as has been described before for the sending direction. The frequency sub-bands TF1 to TFn are given the same designation on purpose, since always the same frequency ranges are involved. Here too similarly adjustable attenuation devices DG2.1 to DG2.n are provided for each partial frequency band TF1 to TFn. The signal reconstituted by the synthesis polyphase filter band SPF2 is emitted at the sending output S2 of the control device. For Each individual frequency sub-band TF1 to TFn, a corresponding voice evaluation circuit SA1 to SAn is provided. By comparing the occurring deviations from a preset rest level it is possible to ascertain whether greater voice activity is taking place in the sending direction or in the receiving direction. The appropriate corresponding level balance circuit PW1 to PWn is accordingly adjusted so that the attenuating device assigned to the less active direction of transmission, e.g. attenuation device DG1.1, receives greater attenuation. When the voice activity changes due to the pauses in conversation by one of the speakers as they occur in a normal telephone conversation, the corresponding level balance circuit PW1 to PWn are set in the opposite direction and the corresponding attenuation devices DG are thus controlled. These measures are carried out for each individual frequency sub-band TF1 to TFn, separately from and independently for each other. In this way it is even possible, within certain limits, to send and receive at the same time in both directions. This can be explained through the fact that during simultaneous speech, and depending on the voice characteristics of the two speakers, the sending direction can be more active in some frequency sub-bands and the receiving direction can be more active in other frequency sub-bands.

To avoid that this effect may lead to undersired feedback effects, provisions are made (but not shown) in the control device SE so that by scanning the setting of the level balance circuits it can be ascertained in which direction of transmission more frequency sub-bands TF1 to TFn are more voice-active. As a result of this ascertainment the attenuation devices, e.g. DG2.a to DG2.n of the overall less active direction of the transmission can then be subjected to greater attenuation values.

Figure 3:
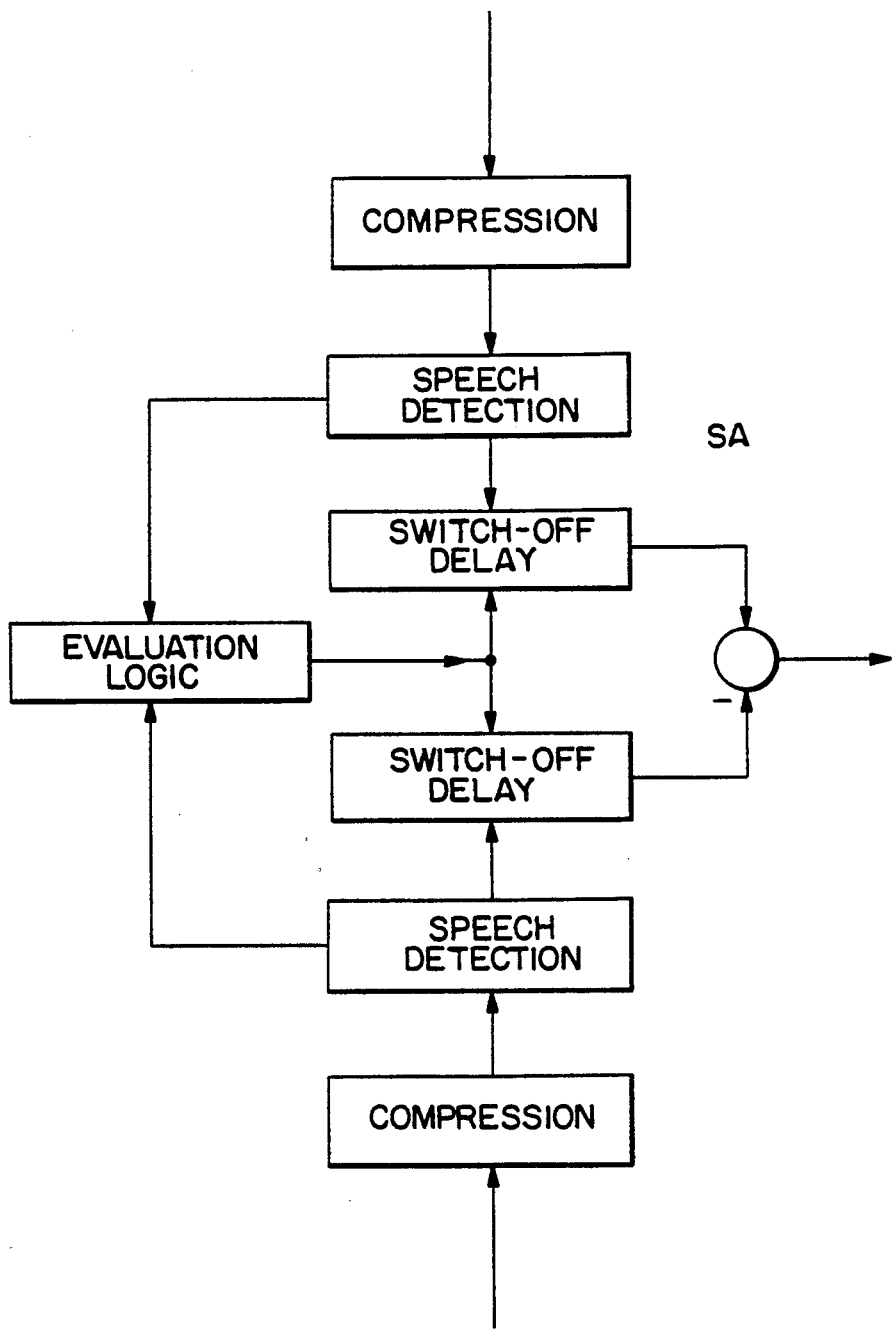
FIG. 3 shows the functioning principle of the direction control used in the device of FIG. 2.

In FIG. 3 the functioning principle of the regulation of direction in shown in greater detail. The sub-band signals occurring in each sub-band in the sending and receiving directions are subjected to compression. The known transportation table linear-PMC, optionally according to mu or the A law, can for instance be used to carry out the compression. This is necessary so that different levels, such as they may occur with different agreed-upon distances from the microphone in the sending direction, or with strong circuit attenuation in the receiving direction, may be compensated.

The voice detector which then follows interacts with the compressed signals and evaluates the short-time power and the interference power. In this way a differentiation between background noise or interference signals of a constant character and the voice signal, which is known to have a distinct burst character, is achieved. To find power, recursive filters (IIR filter) are used. The evaluation of the interference power is carried out only during speaking pauses, so that an updated comparison value is always available for newly arriving voice signals. Mistaken decisions of the voice detector are avoided to a great extent through this measure.

The voice detectors are followed by switch-off delays which are achieved by means of two counters. These are controlled as a function of an evaluation logic and of the decision of the voice detector. One of the counters serves to bridge short speaking pauses (silence interval). The other counter represents the fall time following voice detection. It is set to a predetermined value by the voice detector when the voice decision is made and is decremented down to zero by the evaluation logic when the voice-end decision is made. Its value is used as a measure for voice activity in the distribution of the attenuation in the sub-band by the level balance circuit PW.

The evaluation logic assesses the state of the voice detectors in all sub-bands. For example, by setting or decrementing the above-mentioned counter when activity is obviously mostly in one direction, a through-switching over the entire band in that direction can be forced. Other assessments, e.g. according to principles of hearing physiology or voice statistics could be possible.

The difference of the counters for voice-end detection is used in the level balance circuit PW as a measure for the distribution of the attenuation. The more active direction in the sub-band can be recognized at any time in the sign (plus or minus) of the difference. The attenuation in the sub-band is now distributed in such manner that when the negative difference is at a maximum, one direction is attenuated with a maximum value and the other is switched through transparently, while this is reversed with maximum positive difference. All intermediary values bring about attneuation in both directions in such manner that their sum remains equal to the maximum value. When the active direction changes, smooth transitions are thus achieved.

Finally, the above described embodiments of the invention are intended to be illustrative only. Numerous alternative embodiments may be devised by those skilled in the art without departing from the spirit and scope of the following claims.

We claim:

1. A method for providing voice controlled attenuation adjustments in a telephone transmission circuit comprising the steps of, receiving a first signal propagating in a first direction and a second signal propagating in a second direction, decomposing said first signal into a first set of sub-band signals in a set of predetermined frequency sub-bands and decomposing said second signal into a second set of sub-band signals in said set of predetermined frequency sub-bands, evaluating corresponding first and second sub-band signals in each of said frequency sub-bands by compressing the first and second sub-band signals in each of said frequency sub-bands, detecting voice and non-voice portions in the compressed sub-band signals in each of said frequency sub-bands, and adjustably allocating a predetermined amount of attenuation between the incoming and outgoing directions in each of said frequency sub-bands in response to the voice and non-voice portions of the compressed first and second sub-band signals in each of said frequency sub-bands, attenuating each of the sub-band signals in said first set of sub-band signals by a variable amount as determined by said allocating step and attenuating each of the sub-band signals in said second set of sub-band signals by a variable amount as determined by said allocating step, and recombining said first set of sub-band signals after said first set of subband signals has been attenuated and recombining said second set of sub-band signals after said second set of subband signals has been attenuated.

2. A device for providing voice controlled adjustments in a telephone transmission circuit comprising:

means for receiving a first signal propagating in a first direction and means for receiving a second signal propagating in a second direction, a first analysis filter bank for decomposing said first signal into a first set of sub-band signals in a set of predetermined frequency sub-bands and a second analysis filter bank for decomposing said second signal into a second set of sub-band signals in said set of predetermined frequency sub-bands, a plurality of first variable attenuation devices, one of which being associated with each of said first set of sub-band signals, a plurality of second variable attenuation devices one of which being associated with each of said second set of sub-band signals, a plurality of evaluation means for evaluating the first and second sub-band signals in each of said frequency sub-bands, each of said evaluation means comprising means for compressing the first sub-band signal and the second sub-band signal in a corresponding frequency sub-band, means for detecting voice and non-voice portions in the compressed first and second sub-band signals in the corresponding frequency sub-band, and means for adjustably allocating a predetermined amount of attenuation between the particular one of said plurality of first variable attenuation devices associated with the corresponding frequency sub-band and the particular one of said plurality of second variable attenuation devices associated with the corresponding frequency sub-band in response to the voice and non-voice portions of the compressed first and second sub-band signals of the corresponding frequency sub-band, said allocation means being in communication with said particular one of said plurality of first attenuation devices and said particular one of said second plurality of attenuation devices, and a first synthesis filter bank for recombining said first set of sub-band signals after said first set of sub-band signals has been attenuated by said plurality of first attenuation devices and a second synthesis filter bank for recombining said second set of sub-band signals after said second set of sub-band signals has been attenuated by said plurality of second attenuation devices.

* * * * *